US012756699B2

(12) United States Patent
Dunnum et al.

(10) Patent No.: US 12,756,699 B2
(45) Date of Patent: Oct. 6, 2026

(54) SYSTEM AND METHOD TO LEVERAGE HARDWARE-BASED DEVICE IDENTITY FOR COOKIELESS SESSION TRACKING

(71) Applicant: Cisco Technology, Inc., San Jose, CA (US)

(72) Inventors: Ethan A. Dunnum, South Lyon, MI (US); Riley Rose Van Alsburg, Austin, TX (US); David William Matteson, Dexter, MI (US); Kara Daisy Mahan, Ann Arbor, MI (US); Sebastian Jack Green-Husted, Lansing, MI (US); Zachary O. Weglarz, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 19/042,247

(22) Filed: Jan. 31, 2025

(65) Prior Publication Data

US 2026/0142959 A1 May 21, 2026

Related U.S. Application Data

(60) Provisional application No. 63/721,197, filed on Nov. 15, 2024.

(51) Int. Cl.
*H04L 9/40* (2022.01)

(52) U.S. Cl.
CPC ................................ *H04L 63/0815* (2013.01)

(58) Field of Classification Search
CPC ..................................................... H04L 63/815
See application file for complete search history.

(56) References Cited

U.S. PATENT DOCUMENTS

| | | | | |
|---|---|---|---|---|
| 7,873,734 | B1 | 1/2011 | Eidelman et al. | |
| 10,235,512 | B2 * | 3/2019 | Gnanasekaran | H04W 12/06 |
| 11,177,955 | B2 * | 11/2021 | Jacobs | H04L 9/3073 |
| 11,233,802 | B1 * | 1/2022 | Rudeanu | H04L 63/0435 |
| 12,141,248 | B2 * | 11/2024 | Agrawal | G06F 21/51 |
| 12,381,866 | B2 * | 8/2025 | Guck | H04L 63/0807 |
| 12,556,403 | B2 * | 2/2026 | Kinney | H04L 9/3247 |
| 2014/0189808 | A1 | 7/2014 | Mahaffey et al. | |
| 2020/0059786 | A1 * | 2/2020 | Farag | H04L 9/3236 |

(Continued)

OTHER PUBLICATIONS

Alizai Z.A., et al., "Key-based Cookie-less Session Management Framework for Application Layer Security", IEEE Access, Sep. 11, 2019, pp. 1-12.

*Primary Examiner* — Viral S Lakhia
(74) *Attorney, Agent, or Firm* — Baker Botts L.L.P.

(57) ABSTRACT

A system includes one or more processors configured to receive an encrypted message from a digital network interface, extract one or more identifiers from the encrypted message, determine whether the one or more identifiers at least partially match at least one session identifier associated with a saved session in a secure database, transmit an authentication approval to the digital network interface in response to determining that the one or more identifiers at least partially match the at least one session identifier associated with the saved session in the secure database, and enable access to the network resources via the digital network interface in response to transmitting the authentication approval to the digital network interface.

20 Claims, 7 Drawing Sheets

Operational Flow 200

(56) References Cited

U.S. PATENT DOCUMENTS

| | | | |
|---|---|---|---|
| 2020/0099677 A1 | 3/2020 | Grajek et al. | |
| 2020/0382297 A1* | 12/2020 | Basile | H04L 9/3247 |
| 2023/0351047 A1 | 11/2023 | Tola | |

* cited by examiner

SYSTEM AND METHOD TO LEVERAGE HARDWARE-BASED DEVICE IDENTITY FOR COOKIELESS SESSION TRACKING

RELATED APPLICATIONS

This application claims priority to U.S. patent application Ser. No. 63/721,197, filed Nov. 15, 2024, which is hereby incorporated by reference in its entirety.

TECHNICAL FIELD

The present disclosure relates generally to network security, and more particularly, to a system and method to leverage hardware-based device identity for cookieless session tracking.

BACKGROUND

Tracking user sessions for Single Sign On (SSO) or Multi-Factor Authentication (MFA) via cookies leaves user sessions subject to hijacking attacks. If an attacker gains access to a cookie value, the attacker may impersonate a user associated with the user sessions. Cookies are plain text values within a browser environment and may be easily accessed from an on-disk storage in the browser if the attacker gains user level device access. Additionally, tracking user sessions for SSO or MFA via cookies may necessitate users logging into the SSO service or the MFA service multiple times on a single device due to cookies being isolated between browsers and embedded web views within native applications.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1A:
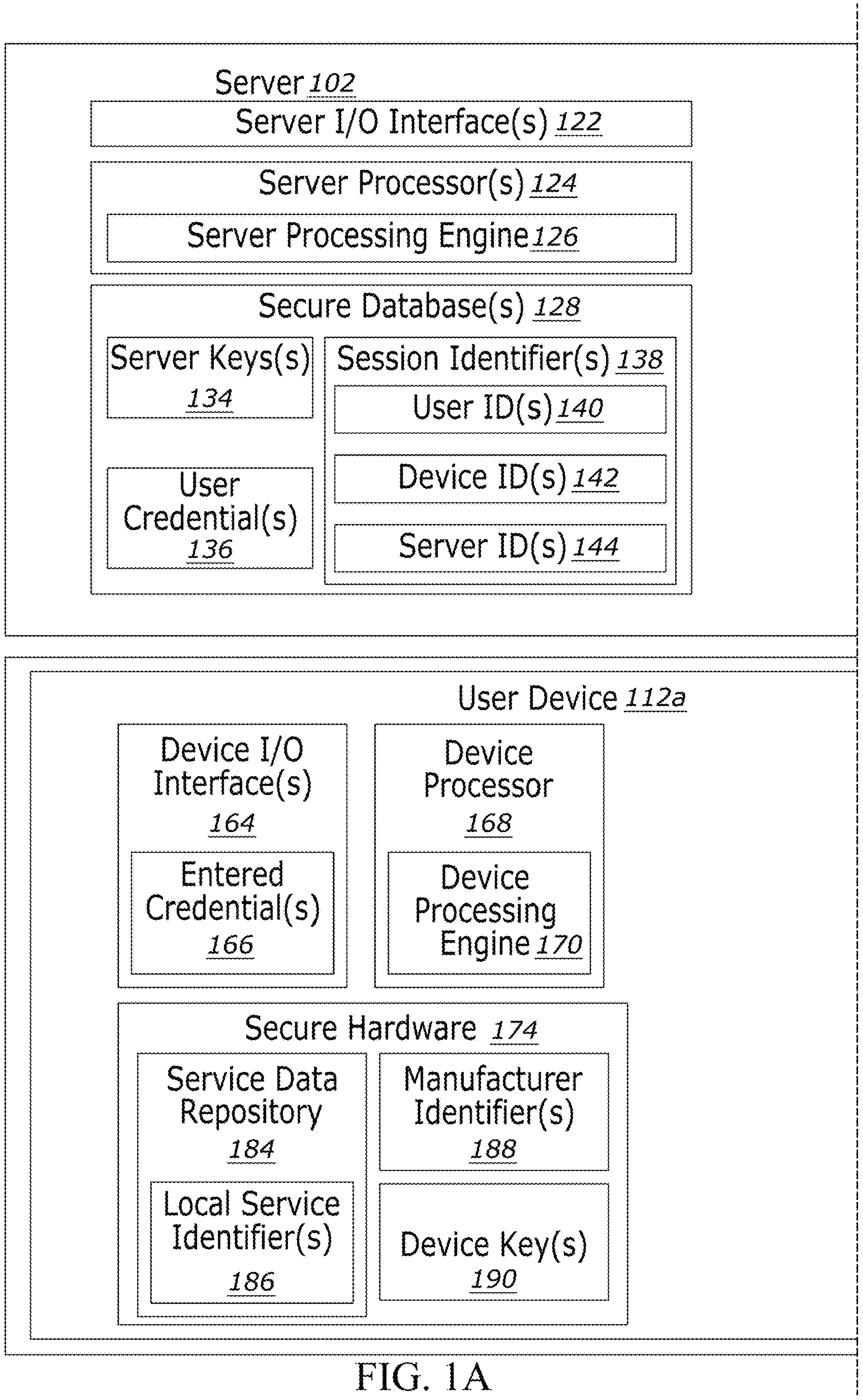
FIGS. 1A-1C illustrate a system to leverage hardware-based device identity for cookieless session tracking, according to some embodiments of the present disclosure.

In one or more embodiments, a system and method described herein leverage hardware-based device identity for cookieless session tracking (e.g., without relying on cookies and/or browser cookies). In some embodiments, a method for leveraging a hardware-based device identity for cookieless session tracking is provided. In some embodiments, the method may include initiating, by a user, an authentication process for an application in a browser or embedded web view on a user device. The method may also include initiating, during the authentication process and by a prompt running within the browser or embedded web view on the user device, a Hypertext Transfer Protocol Secure (HTTPS) request to a localhost listener of a security application running on that same user device to request a posture report on the user device.

In some embodiments, the method includes collecting, by the security application, posture data including various device identifiers, and then signing the posture report using signing keys that uniquely identify the user and the user device. The method may also include communicating the posture report to an authentication cloud service, where the signatures are validated against public keys that are stored in the cloud service associated with the user and the user device. The method further include searching, by the authentication service, for any sessions associated with the user, the user device, and the application the user is authenticating into once the user's identity and the user device have been cryptographically validated.

If any existing session is found for the user, the user device, and application, the method may also include using the existing session and authenticating the user without interaction. If no session is found for the user, the user device, and the application, then the method may include authenticating the user as normal and creating, by the authentication service, a new session once authentication is successful.

In accordance with one or more embodiments, a system or an apparatus, such as a network component, includes a memory and a processor communicatively coupled to one another. The system may leverage hardware-based device identity for cookieless session tracking. The network element may include one or more processors and one or more computer-readable non-transitory storage media coupled to the one or more processors and including instructions that, when executed by the one or more processors, cause the network element to perform operations. The operations may include receiving a first encrypted message from a first digital network interface. The first encrypted message may include one or more identifiers signed using one or more private keys. The first encrypted message may be encrypted as part of one or more operations configured to request access to first network resources via the first digital network interface. The one or more identifiers may reference a service identifier that is associated with the service. The operations may further include extracting the one or more identifiers from the first encrypted message, validating a signature associated with the one or more identifiers, determining whether the one or more identifiers at least partially match at least one session identifier associated with a saved session in a secure database, transmitting an authentication approval to the first digital network interface in response to determining that the one or more identifiers at least partially match the at least one session identifier associated with the saved session in the secure database, and enabling access to the first network resources via the first digital network interface in response to transmitting the authentication approval to the first digital network interface.

In accordance with certain embodiments, the operations include receiving a second encrypted message from a second digital network interface. The second encrypted message may include the one or more identifiers signed using the one or more private keys. The second encrypted message may be encrypted as part of one or more operations configured to request access to second network resources via the second digital network interface. The operations may further include extracting the one or more identifiers from the second encrypted message, validating a signature associated with the one or more identifiers, determining whether the one or more identifiers at least partially match the at least one session identifier associated with the saved session in the secure database, transmitting an authentication denial to the second digital network interface in response to determining that the one or more identifiers do not at least partially match the at least one session identifier associated with the saved session in the secure database, and blocking access to the second network resources via the second digital network interface in response to transmitting the authentication denial to the second digital network interface.

In accordance with certain embodiments, the operations include receiving a second encrypted message from a second digital network interface.

In some cases, the credentials may be retrieved via the input interface from a secure database collocated and communicatively coupled with the processor. The credentials may be entered in the input interface by a user. The credentials may include a password. The credentials may include a password certified via a multi-factor authentication process. The second encrypted message include one or more credentials. The second encrypted message include the one or more identifiers signed using the one or more private keys. The second encrypted message is encrypted as part of one or more operations configured to request access to second network resources via the second digital network interface. The operations also include extracting the credentials and the one or more identifiers from the second encrypted message, validating a signature associated with the one or more identifiers, verifying the credentials against one or more stored credentials in the secure database, starting a new session in the secure database, generating a new session identifier based at least in part upon the one or more identifiers in the secure database, transmitting an additional authentication approval to the second digital network interface, enabling access to the second network resources via the second digital network interface in response to transmitting the authentication approval to the second digital network interface.

In accordance with certain embodiments, the credentials may be retrieved via an input interface from a secure database collocated and communicatively coupled with the one or more processor and entered in the input interface by a user. In some embodiments, the credentials include a password certified via a multi-factor authentication process.

In accordance with certain embodiments, the operations include receiving a third encrypted message from a third digital network interface. The third encrypted message may include the one or more identifiers signed using the one or more private keys. The third encrypted message is encrypted as part of one or more operations configured to request access to third network resources via the third digital network interface. The operations also include extracting the one or more identifiers from the third encrypted message, validating a signature associated with the one or more identifiers, determining whether the one or more identifiers at least partially match the new session identifier associated with the new session in the secure database, transmitting a new additional authentication approval to the third digital network interface in response to determining that the one or more identifiers at least partially match the new session identifier associated with the new session in the secure database, and enabling access to the third network resources via the third digital network interface in response to transmitting the new additional authentication approval to the third digital network interface.

In one or more embodiments, the first digital network interface does not store or exchange browser cookies.

According to another embodiment, a method includes receiving a first encrypted message from a first digital network interface. The first encrypted message may include one or more identifiers signed using one or more private keys. The first encrypted message may be encrypted as part of one or more operations configured to request access to first network resources via the first digital network interface. The one or more identifiers may reference a service identifier that is associated with the service. The operations may further include extracting the one or more identifiers from the first encrypted message, validating a signature associated with the one or more identifiers, determining whether the one or more identifiers at least partially match at least one session identifier associated with a saved session in a secure database, transmitting an authentication approval to the first digital network interface in response to determining that the one or more identifiers at least partially match the at least one session identifier associated with the saved session in the secure database, and enabling access to the first network resources via the first digital network interface in response to transmitting the authentication approval to the first digital network interface.

According to yet another embodiment, one or more computer-readable non-transitory storage media embody instructions that, when executed by a processor, cause the processor to perform operations. The operations may include receiving a first encrypted message from a first digital network interface. The first encrypted message may include one or more identifiers signed one or more private keys. The first encrypted message may be encrypted as part of one or more operations configured to request access to first network resources via the first digital network interface. The one or more identifiers may reference a service identifier that is associated with the service. The operations may further include extracting the one or more identifiers from the first encrypted message, validating a signature associated with the one or more identifiers, determining whether the one or more identifiers at least partially match at least one session identifier associated with a saved session in a secure database, transmitting an authentication approval to the first digital network interface in response to determining that the one or more identifiers at least partially match the at least one session identifier associated with the saved session in the secure database, and enabling access to the first network resources via the first digital network interface in response to transmitting the authentication approval to the first digital network interface.

Technical advantages of certain embodiments of this disclosure may include one or more of the following. Certain embodiments described herein leverage a hardware-based device (e.g., Duo Desktop's hardware-based device) identity mechanism for cloud-side, cookieless session tracking and management, which protects against session hijacking and facilitates true single login for users. The hardware-based device guarantees device consistency using private keys that are generated on a user device's hardware security module (e.g., a Trusted Platform Module (TPM) and/or additional secured hardware) on a user device (e.g., a Windows or Linux device, or the Secure Enclave on macOS devices). Since these private keys are not exportable from the user device, when they are used to sign data, it guarantees that signing happened on that device. This disclosure describes systems and methods for leveraging the hardware-based device identity for cookieless session tracking. While native applications that have a web interface that runs within an embedded web view may store sessions in various non-cookie ways, the sessions described herein can be used across different applications and may be backed by TPM/Secure Enclave generated key pairs where the private key is non-exportable from the device. In some embodiments, the private keys are used to sign one or more payloads, creating cryptographic signatures that guarantees that none of the payloads may be modified or the signature may be invalidated.

In some embodiments, the system and method described herein are integrated into a practical application of increasing processing speed and reducing memory usage in the system. Specifically, the system and the method reduce or eliminate delays or data congestions caused by attacks involving network applications associated with one or more applications. In certain embodiments, the system and method are integrated into a practical application of reducing an overall amount of network traffic due to pausing of application transmissions and operations resulting from attacker interruptions. This reduces the traffic on the network and helps alleviate network bottlenecks that could otherwise occur during operations requiring multiple-layer application asset operations such as those involving Artificial Intelligence (AI) and Machine Learning (ML) procedures. Other methods of cookie hardening (e.g., Chromium Device Bound Session Credentials) still rely on browser cookies stored in a user device, whereas certain embodiments described herein do not store session identifiers on the user device. Whereas other methods of cookie hardening (e.g., Chromium browser) and are limited to a single client, certain embodiments described herein utilize an outside authentication system that is leveraged by an authentication process happening within any digital network interface (e.g., browser or embedded web view) on the user device.

Using this guarantee of device consistency, a session state may be tracked entirely in a cloud-based authentication system. Herein, little or no session tracking may be performed on the user device, which prevents session information from being stolen by an attacker and used on other devices to steal the information associated with a given user. In certain embodiments, the method allows session state management to be performed entirely in the cloud. In some embodiments, tracking the session state in the cloud allows sessions to be shared across services on the user device without requiring re-entry of credentials. Herein, a user may log in once in a single service in a single digital network interface to verify the user's identity in the user device. Other services logging into a same SSO service or MFA service may verify the session and remember an identity of the user without requiring the user to log in for each separate service. These practical applications may lead to a technical advantage of improving response speed and accuracy to user devices. For example, a technical advantage of one embodiment may allow for improved reliability in real-time communications between a user device and a server in which a server (e.g., an application) may access one or more network resources.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 1B:
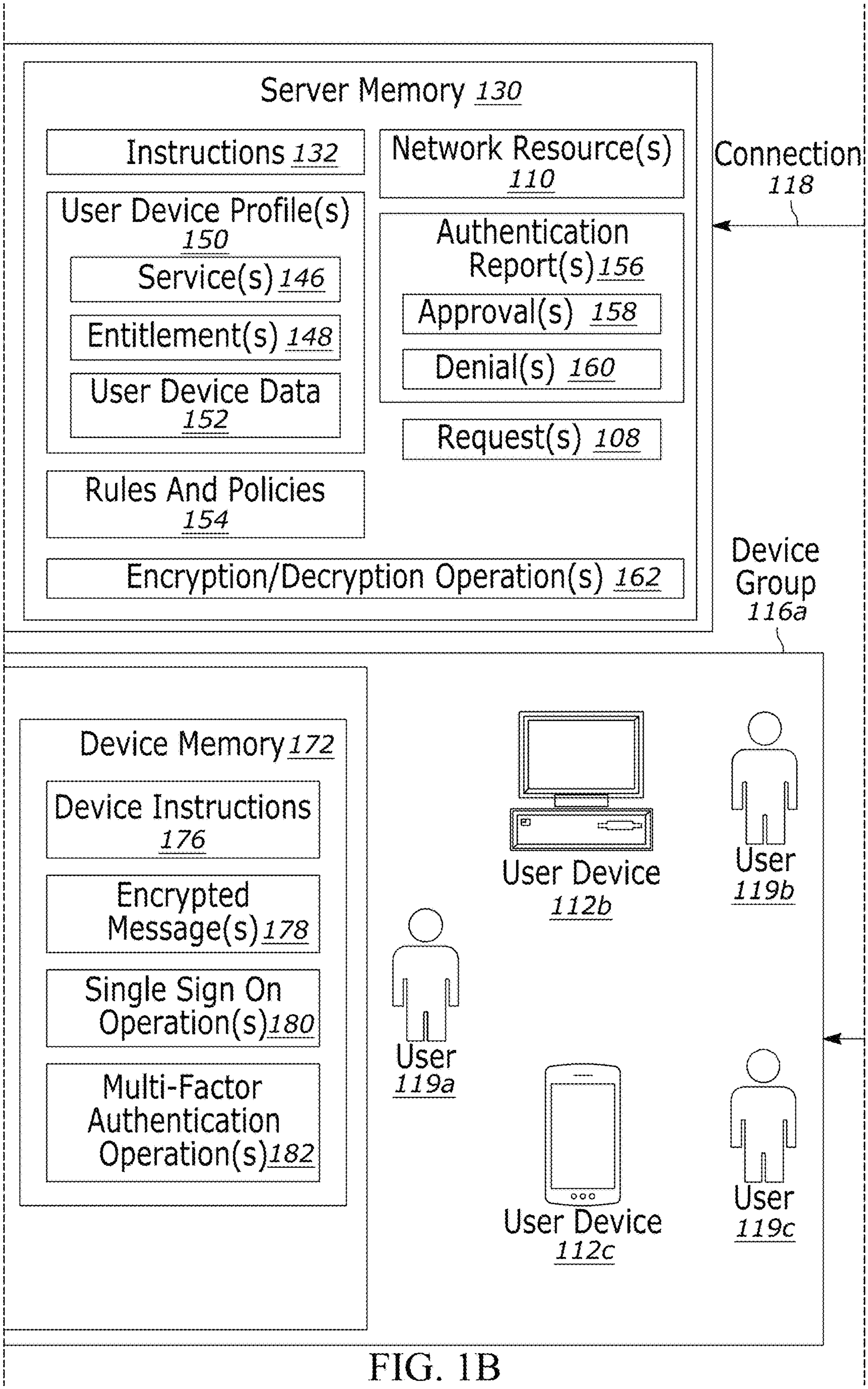
Figure 1C:
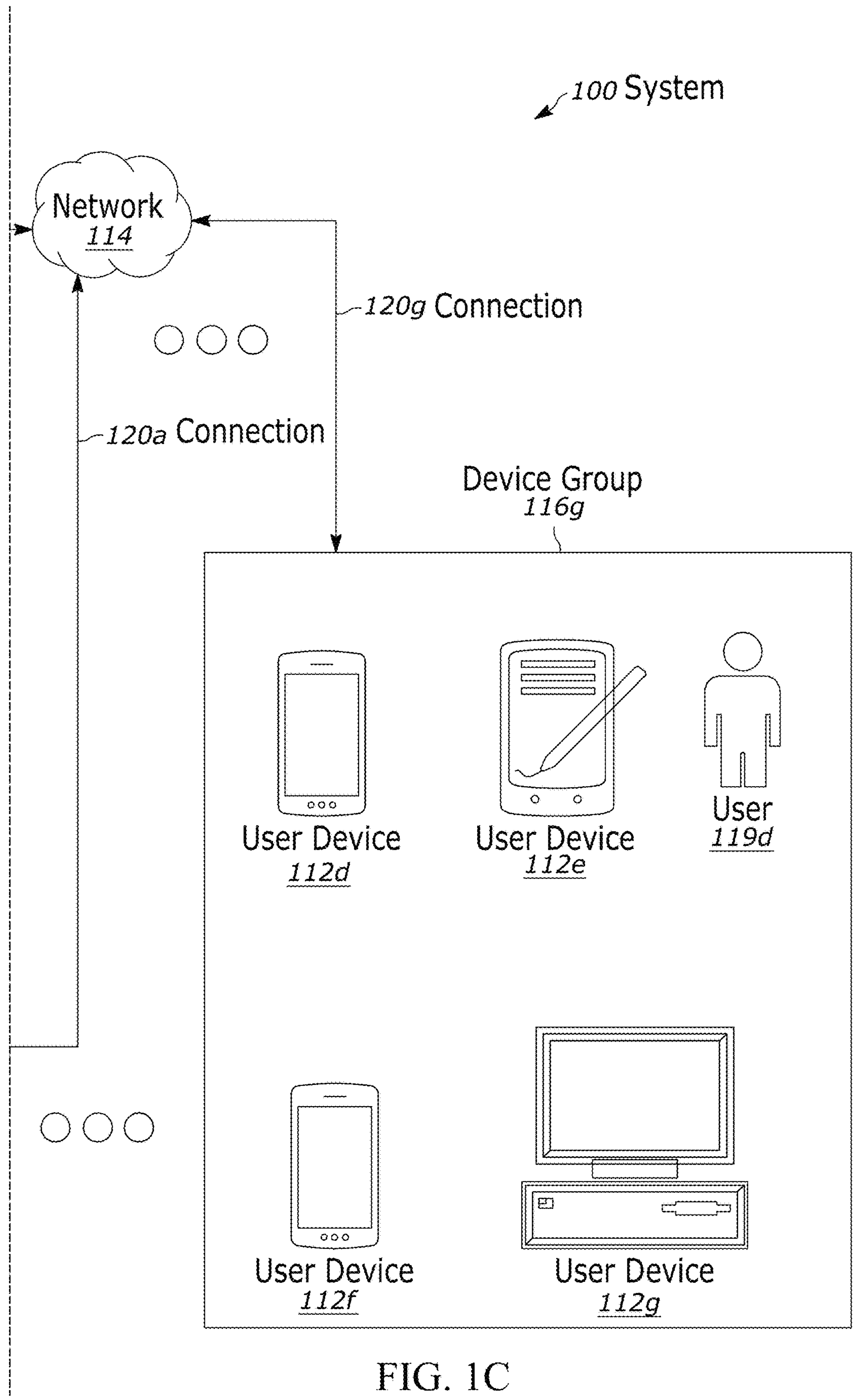
Figure 2A:
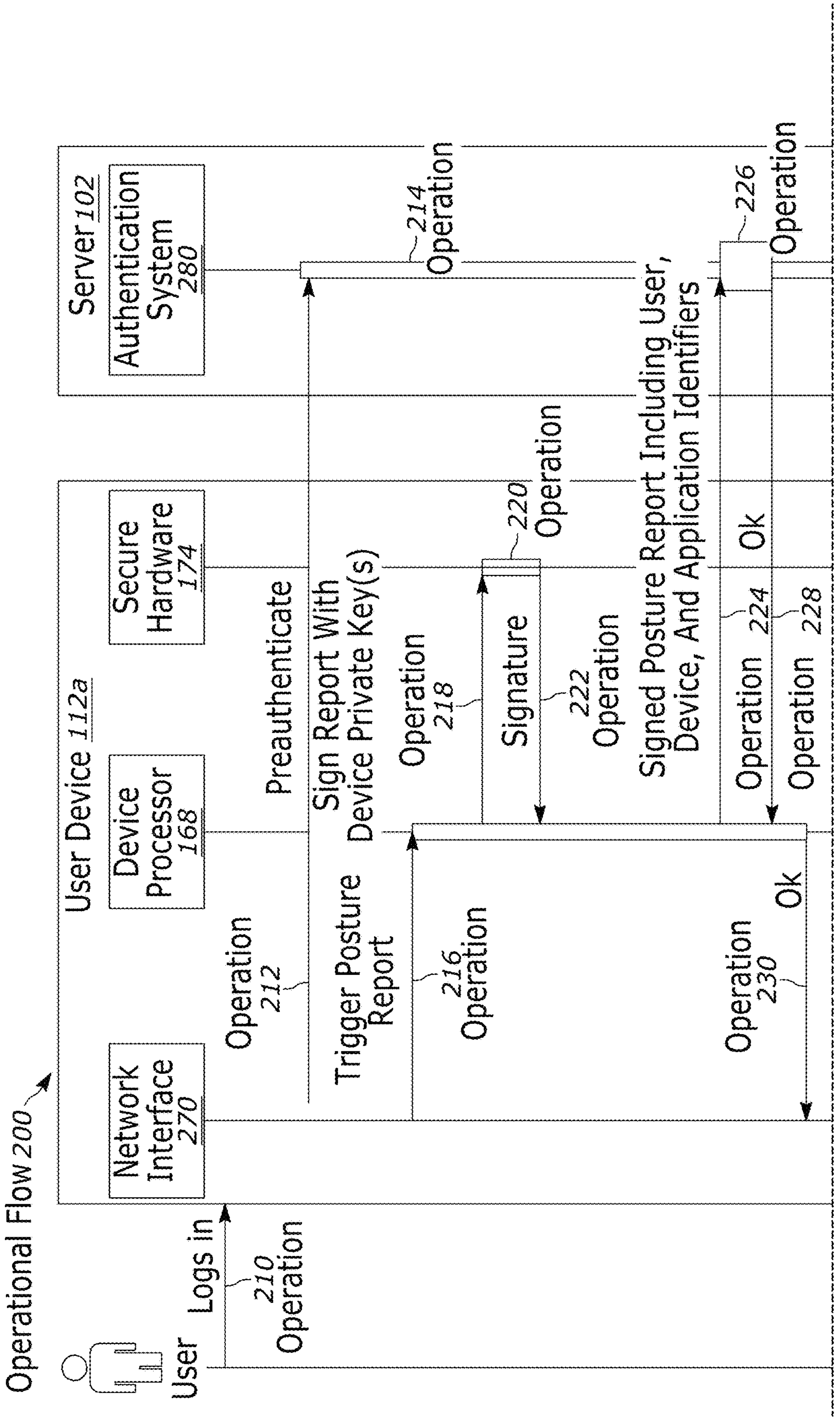
FIGS. 2A and 2B illustrate an operational flow that may be used by the system of FIGS. 1A-1C to leverage hardware-based device identity for cookieless session tracking, according to some embodiments of the present disclosure.
Figure 2B:
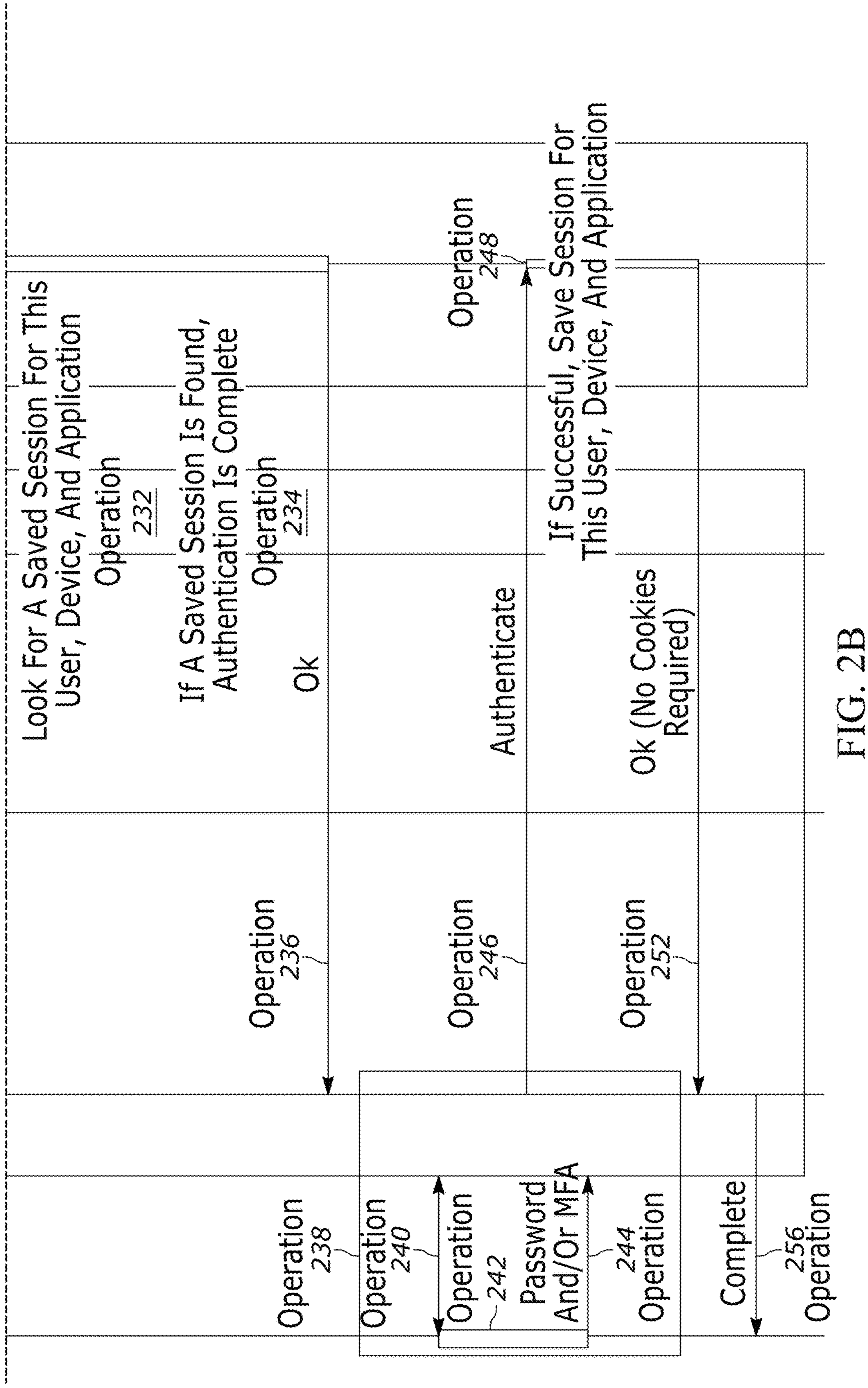
Figure 3A:
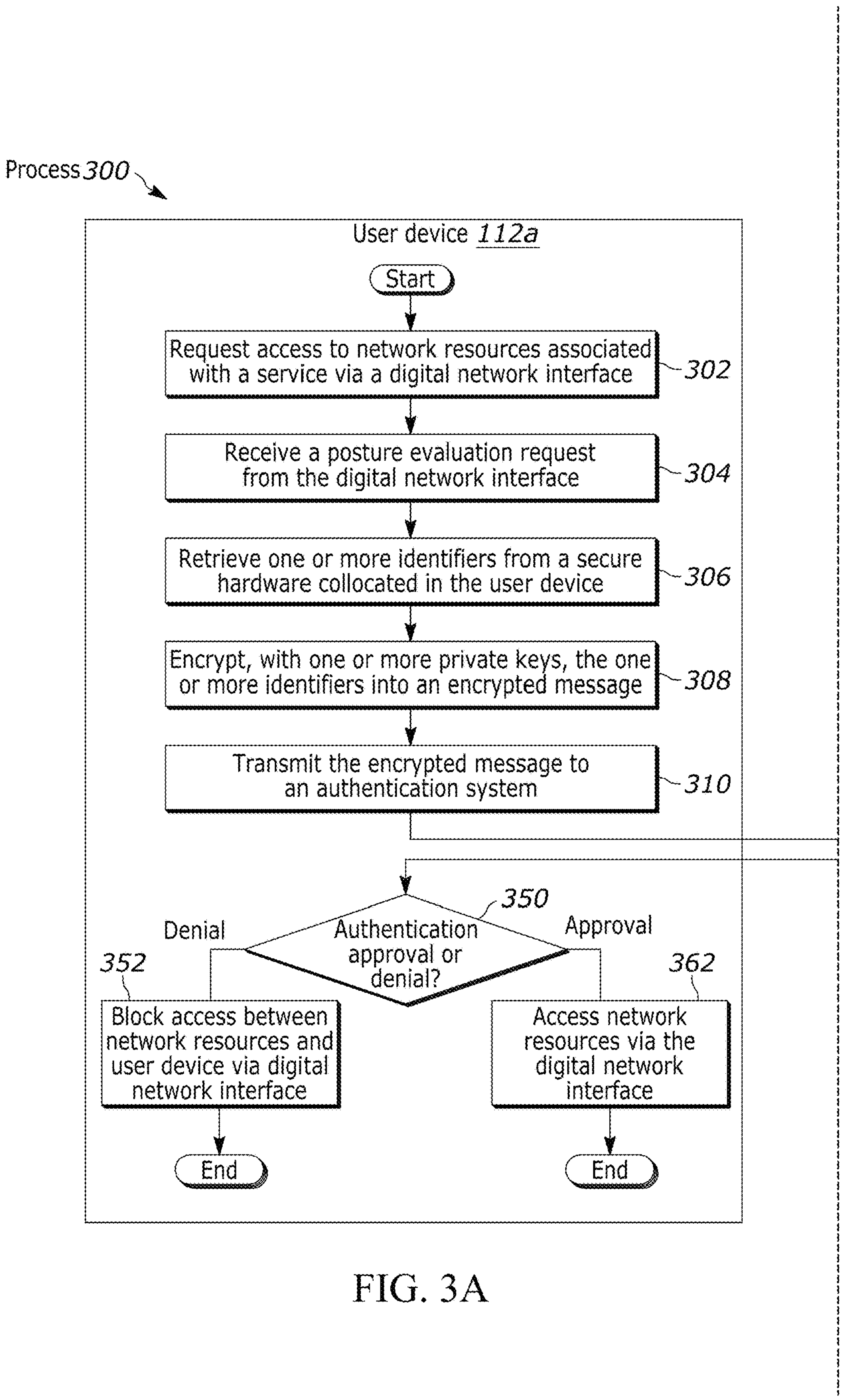
FIGS. 3A and 3B illustrate a process for performing the operational flow of FIGS. 2A and 2B, according to some embodiments of the present disclosure.
Figure 3B:
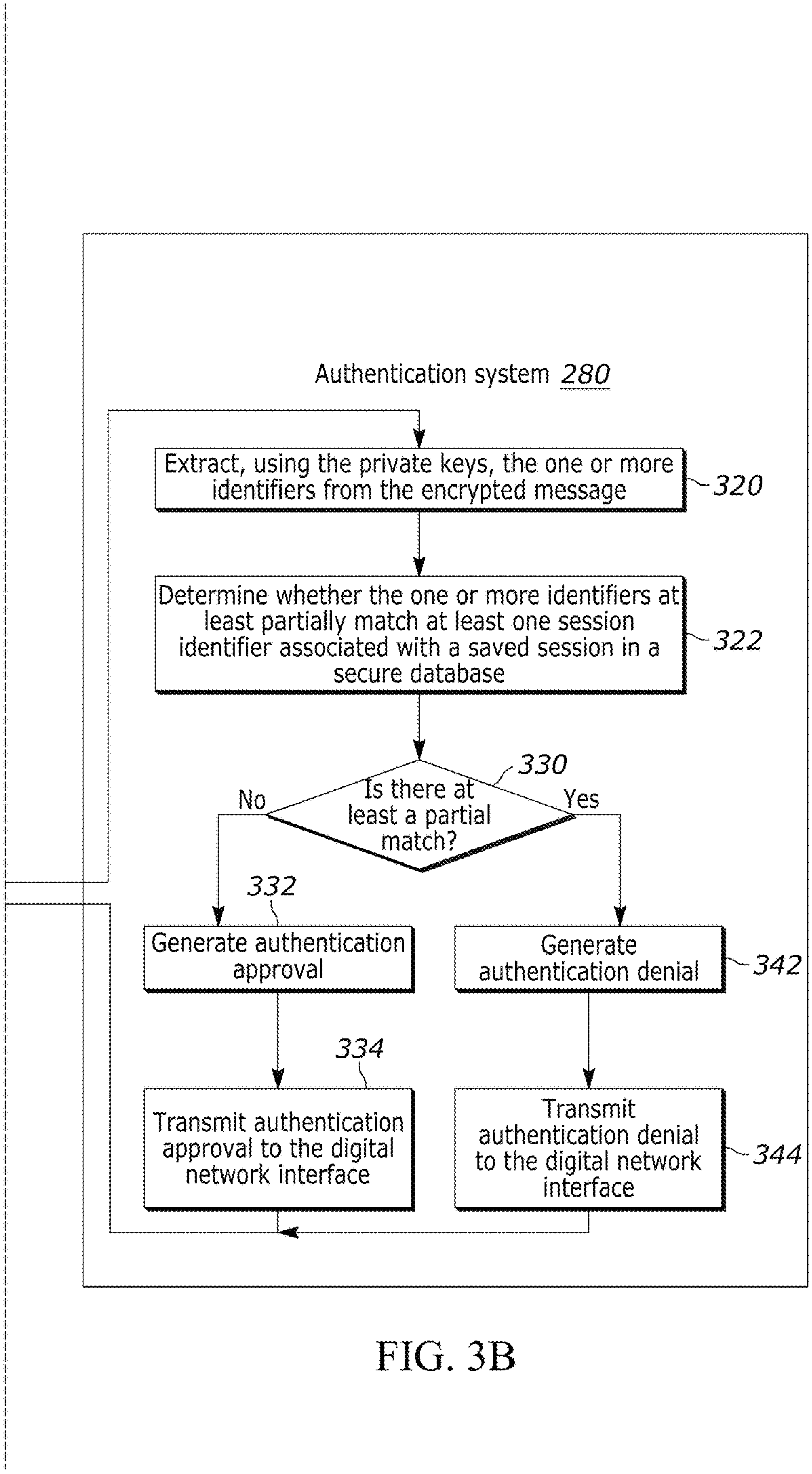

This disclosure describes systems and methods to leverage hardware-based device identity for cookieless session tracking. In particular, this disclosure provides various systems and methods to reduce, prevent, or eliminate unsanctioned access to vulnerable information assets of a user device by preventing, inhibiting, and/or eliminating adverse impacts (e.g., risks) from attacks caused by possible attackers. FIGS. 1A-1C illustrates a system 100 in which hardware-based device identity is leveraged for cookieless session tracking. FIGS. 2A and 2B illustrates an operational flow 200 in which the system 100 of FIGS. 1A-1C is configured to implement cookieless session tracking. FIGS. 3A and 3B illustrates a process 300 to perform the operational flow 200 of FIGS. 2A and 2B.

FIGS. 1A-1C illustrate a system 100 including a server 102 configured to leverage hardware-based device identity for cookieless session tracking, in accordance with one or more embodiments. The server 102 may be configured to verify authenticity of one or more requests 108 to approve or deny access between one or more one or more network resources 110 and one or more user devices 112. The network resources 110 may be processing resources, memory resources, power resources, databases, applications, services, and/or communication networks and systems associated with an organization and/or group. In the system 100 of FIGS. 1A-1C, a server 102 is shown hosting access to the network resources 110. The system 100 includes the server 102 communicably coupled to a user device 112*a*, a user device 112*b*, a user device 112*c*, a user device 112*d*, a user device 112*e*, a user device 112*f*, and a user device 112*g* (collectively, user devices 112) via a network 114. The user devices 112 may be grouped in one or more device groups 116*a*-116*g* (collectively, device groups 116) in accordance with corresponding locations, communication configuration, and/or organization policies. In FIGS. 1A-1C, the server 102 is connected to the network 114 via a connection 118, the user devices 112*a*-112*c* in the device group 116*a* are connected to the network 114 via a connection 120*a*, and the user devices 112*d*-112*g* in the device group 116*g* are connected to the network 114 via a connection 120*g*. The device group 116*a* and the device group 116*g* are representative of multiple possible device groups 116 in a space, distributed among one or more locations. The device groups 116 may be located in warehouses, assembly facilities, residential buildings, and/or private residences. The connection 120 *a* and the connection 120*g* are representative of multiple possible connections 120. The device groups 116 may include multiple distinct or separate sub-groups. In some embodiments, the server 102 may be configured to receive requests 108 from one or more of the user devices 112. The connection 118 and the connections 120 may be wired and/or wireless connections configured to enable communication between the server 102, the network 114, and the user devices 112. In other embodiments, the server 102 and the network 114 may be partially or completely located in a proximity of one or more of the device groups 116 among the user devices 112.

In one or more embodiments, as a non-limiting example, the user devices 112 may be associated with the user 119*a*, the user 119*b*, the user 119*c*, and the user 119*d* (collectively, users 119), among others. In the example of FIGS. 1A-1C, the user 119*a* is shown associated with the user device 112*a*, the user 119*b* is shown associated with the user device 112*b*, the user 119*c* is shown associated with the user device 112*c*, and the user 119*d* is shown associated with the user device 112*e*. There may be multiple additional users 119 or no users 119 associated with the user devices 112. In some embodiments, the user devices 112 may be unassociated with any users 119 and perform one or more roles completely autonomously from ongoing (e.g., constant) human management or intervention. For example, the user devices 112 may be videoconferencing devices in a conference room including one or more peripherals (e.g., displays or speakers). In some embodiments, some of the user devices 112 may be part of a sub-group of user devices 112. In an example, the user device 112*a* and the user device 112*b* may be associated with one another as communication nodes (e.g., acting as routers or anchor points) performing similar tasks such as routing connectivity signals in the device group 116*a*. In another example, the user device 112*f* and the user device 112*g* may be associated with one another as end points of a communication link where data may be exchanged between the user device 112*f* and the user device 112*g*.

In the example of FIGS. 1A-1C, the device group 116*a* is shown including a user device 112*a*, a user device 112*b*, and a user device 112*c*. Further, the device group 116*g* is shown including a user device 112*d*, a user device 112*e*, a user device 112*f*, and a user device 112*g*. In this example, the device group 116*a* may include the user devices 112 of an organization in a building, a device group 116*b* (implicitly referenced in the three dots between the device group 116*a* and the device group 116*g*) may include additional user devices 112 of an individual in an home, and the device group 116*c* (implicitly referenced in the three dots between the device group 116*a* and the device group 116*g*) may include further additional user devices 112 in a specific room of a building (e.g., a conference room). In another example, any of the device groups 116 may include one or more additional user devices 112 and one or more additional users 119 associated with in a specific department or sub-division of an organization.

The server 102 may take any suitable physical form. As an example and not by way of limitation, the server 102 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, a router device, or a combination of two or more of these. Where appropriate, the server 102 may include one or more computer systems, be unitary or distributed; span multiple locations; span multiple machines, span multiple data centers, or reside in a cloud, which may include one or more cloud components in one or more networks. Where appropriate, one or more computer systems may perform without substantial spatial or temporal limitation one or more operations of one or more methods described or illustrated herein. As an example, and not by way of limitation, the server 102 may perform in real-time and/or in batch mode one or more operations of one or more methods and/or one or more communication protocols described or illustrated herein. The server 102 may perform at different times and/or at different locations one or more operations of one or more methods described or illustrated herein, where appropriate.

In one or more embodiments, the server 102 may include one or more server input (I)/output (O) interfaces 122 configured to perform one or more data exchange operations, one or more server processors 124 including a server processing engine 126, one or more secure databases 128, and a server memory 130. The server I/O interfaces 122 may include hardware, software executed by software, or a combination of both, providing one or more interfaces for communication between the server 102 and one or more I/O devices. The server 102 may include one or more of these I/O devices, where appropriate. One or more of these I/O devices may enable communication between the user devices 112 and the server 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any corresponding suitable server I/O interfaces 122. Where appropriate, the server I/O interfaces 122 may include one or more device or software drivers enabling the one or more server processors 124 to drive one or more of these I/O devices. Although this disclosure describes and illustrates particular server I/O interfaces 122, this disclosure contemplates any suitable number of server I/O interfaces 122.

In one or more embodiments, the server I/O interfaces 122 may include a communication interface including hardware, software executed by hardware, or a combination of both providing one or more interfaces for communication (such as, for example, packet-based communication) between the server 102, the one or more user devices 112, the network 114, or one or more additional networks. As an example, and not by way of limitation, the communication interface of the server I/O interfaces 122 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface. As an example, and not by way of limitation, the server 102 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the user devices 112 may communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The server 102 may include any suitable communication interface for any of these networks, where appropriate. Although this disclosure describes and illustrates the server I/O interfaces 122 including particular communication interfaces, this disclosure contemplates any suitable communication interface.

In some embodiments, the server I/O interfaces 122 may include access to the one or more secure databases 128 communicatively coupled to the one or more server processors 124 and the server memory 130. The one or more secure databases 128 may include the one or more wired connections that share an internal bandwidth for data packet transmissions inside the server 102 with the server memory 130. The one or more secure databases 128 may be configured with a buffering capacity and a memory speed. The buffering capacity may indicate a buffering capacity (in bytes) that the storage and databases are capable of handling. For example, the buffering capacity may be 1,000 bytes. The memory speed may indicate a processing speed (in bytes per second) at which the storage and databases is capable of handling or buffering data packets. For example, the memory speed may be 1,000 bytes per second. The storage and databases may include instructions and data memory for the one or more server processors 124.

In particular embodiments, the server I/O interfaces 122 may include a transceiver (e.g., transmitter, receiver, or a combination of both) configured to implement one or more wireless or wired connectivity protocols. In this regard, the transceiver may include antennas including hardware configured to establish one or more communication links (e.g., established via the connection 118 or the connections 120) between the server 102 and one or more of the user devices 112. Although this disclosure describes and illustrates the connection 118 and the connections 120, this disclosure contemplates any arrangement of channels for information exchange.

In other embodiments, the server I/O interfaces 122 may include an interconnect including hardware configured to connect the one or more server processors 124, the secure databases 128, and the server memory 130. As an example and not by way of limitation, the interconnect may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniBand interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

In some embodiments, the one or more server processors 124 include hardware for executing instructions (e.g., instructions 132), such as those making up a computer program. As an example, and not by way of limitation, to execute instructions, the one or more server processors 124 may retrieve (or fetch) the instructions 132 from an internal register, an internal cache, or the server memory 130; decode and execute them; and then write one or more results to an internal register, an internal cache, or the server memory 130. Specifically, the one or more server processors 124 may include one or more internal caches for data, instructions, or addresses. This disclosure contemplates the one or more server processors 124 including any suitable number of internal caches, where appropriate. As an example, and not by way of limitation, the one or more server processors 124 may include one or more instruction caches, one or more data caches, and one or more translation lookaside buffers (TLBs). Instructions in the instruction caches may be copies of instructions 132 in the server memory 130, and the instruction caches may speed up retrieval of those instructions by the one or more server processors 124. Data in the data caches may be copies of data in the server memory 130 for instructions executing at the one or more server processors 124 to operate on via one or more server processing engines 126; the results of previous instructions executed at the one or more server processors 124 for access by subsequent instructions executing at the one or more server processors 124 or for writing to the server memory 130, or other suitable data. The data caches may speed up read or write operations by the one or more server processors 124. The TLBs may speed up virtual-address translation for the one or more server processors 124. In particular embodiments, the one or more server processors 124 may include one or more internal registers for data, instructions, or addresses. This disclosure contemplates the one or more server processors 124 including any suitable number of suitable internal registers, where appropriate. Where appropriate, the one or more server processors 124 may include one or more arithmetic logic units (ALUs); be a multi-core processor; or include one or more additional one or more server processors 124. Although this disclosure describes and illustrates a particular processor, this disclosure contemplates any suitable processor.

In one or more embodiments, the one or more server processors 124 include hardware, software executed by hardware, or a combination of both, configured to reprovision the user devices 112 to perform one or more tasks in the device groups 116. In some embodiments, the one or more server processors 124 are configured to determine communication reciprocity for a specific user device 112 within a specific device group 116. The one or more server processors 124 may be one or more routing devices configured to route resources in the network 114 to additional user devices 112. In some embodiments, the one or more server processors 124 may be included on a same card or die. In this regard, the one or more server processors 124 may be configured to determine types of data exchanged by the user devices 112. The types of data may include sound, video, or informational details associated with any of the user devices 112.

In other embodiments, the processing engine 126 may be software executed by hardware and configured to dynamically aid the user devices 112 to maintain synchronization parameters during synchronization operations. The processing engine 126 may be implemented by the one or more server processors 124 operating as specialized hardware accelerators. The processing engine 126 may be configured to implement networking-specific processing tasks in custom logic and achieve better performance than typical software implementations. For example, the processing engine 126 may be lookup engines (e.g., using specialized logic), cryptographic coprocessors, content inspection engines, and the like. In some embodiments, the one or more processing engines configured to operate the secure databases 128 via execution of one or more of the instructions 132.

In one or more embodiments, the server processor 124 is hardware, software executed by hardware, or a combination of both configured to regulate the types of data shared among two or more of the user devices 112 and/or between the server 102 and one or more of the user devices 112. In some embodiments, the server 102 may assist in establishing a communication link (example shown in reference to FIGS. 2A and 2B) between any two or more user devices 112 and/or between the server 102 and one or more of the user devices 112. In implementing the communication links, the server 102 may monitor data shared by each of the user devices 112 and control that specific types of data are reciprocated to at least one of the user devices 112. In this regard, the server processor 124 may regulate the types of data presented at a given user device 112 based at least in part upon the types of data that the given user device is configured to share. In some embodiments, the server processor 124 may be configured to schedule timings for transmissions of multiple user devices 112 to evaluate the data transmitted. In other embodiments, the server processor 124 may be configured to determine multiple data exchange settings (e.g., communication preferences of a given user device 112) and determine whether the given user device 112 is configured to share a specific type of data. The server processor 124 may include a security chipset configured to establish one or more physical gates/firewalls at the server 102 or at one or more of the user devices 112, a wireless chipset configured to provide wireless connectivity capabilities, and a routing chipset configured to regulate data exchanging capabilities by reducing or increasing access to specific types of data. In other embodiments, the security chipset, the wireless chipset, and the routing chipset may be combined into a same chipset sharing common memory resources and processing resources.

In one or more embodiments, the secure databases 128 may be configured to store one or more data elements and/or record elements. The secure databases 128 may include one or more server keys 134, one or more user credentials 136, and one or more session identifiers 138 associated with one or more users 119 and/or one or more user devices 112 among others. The session identifiers 138 may include one or more user identifiers (IDs) 140, one or more user device IDs 142, and one or more server IDs 144. The secure databases 128 may be secured with multiple firewalls and/or authentication protocols. The secure databases 128 may be configured to store encrypted data, secured data elements, and/or tokens representative of actual data. The one or more server keys 134 may be one or more passphrases, encryption keys, passwords, passkeys, access commands, decryption parameters, and/or pin codes configured to enable decryption, encryption, and/or combination of one or more data elements and/or one or more data records. The one or more user credentials 136 may be one or more received, collected, and/or generated access credentials configured to provide permission and/or permission requests to access one or more of the network resources 110. The one or more user credentials 136 may be one or more username and password combinations configured to provide access to one or more network resources 110. The one or more user credentials 136 may cause the server 102 to request access to performing one or more operations in association with one or more applications (e.g., services 146) in accordance with one or more entitlements 148 associated with one or more users 119 and/or one or more user devices 112. The user credentials 136 may be one or more bitstrings, text data, and/or image data representative of one or more aspects of the user device profiles 150. The one or more session identifiers 138 may be one or more IDs associated with a given user 119 and/or one or more user devices 112 that are encrypted in accordance with one or more security protocols and/or encryption protocols. The session identifiers 138 may be representative signed versions of one or more IDs associated with a given user 119 and/or one or more user devices 112 instead of the actual IDs. The one or more session identifiers 138 may be one or more elements configured to be decrypted in accordance with one or more of the server keys 134 and/or any additional number of decryption keys. The one or more user IDs 140 may be one or more IDs associated with a user device profile 150 and/or one or more users 119. The one or more user IDs 140 may be one or more IDs configured to reference a specific user 119 in a session. The one or more user device IDs 142 may be one or more IDs associated with a user device profile 150 and/or one or more user devices 112. The one or more user device IDs 142 may be one or more IDs configured to reference a specific user device 112 in a session. The one or more service IDs 144 may be one or more IDs associated with a user device profile 150 and/or one or more services 146. The one or more service IDs 144 may be one or more IDs configured to reference a specific service 146 in a session.

In one or more embodiments, the server memory 130 includes mass storage for data or instructions. As an example, and not by way of limitation, the server memory 130 may include a solid-state drive (SSD), a hard disk drive (HDD), a floppy disk drive, flash memory, an optical disc, a magneto-optical disc, magnetic tape, or a Universal Serial Bus (USB) drive or a combination of two or more of these. The server memory 130 may include removable or non-removable (or fixed) media, where appropriate. In some embodiments, while the secure databases 128 and the server memory 130 are shown as separate portions of the server 102, the secure databases 128 and the server memory 130 may be included in a same memory unit and/or one or more additional memory units. Further, the server memory 130 may be protected and/or encrypted as described in reference to the secure databases 128. The server memory 130 may be internal or external to a computer system, where appropriate. In particular embodiments, the server memory 130 is non-volatile, solid-state memory. In particular embodiments, the server memory 130 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the server memory 130 as a mass storage taking any suitable physical form. The server memory 130 may include one or more storage control units facilitating communication between the one or more server processors 124 and the server memory 130, where appropriate. Although this disclosure describes and illustrates particular storage, this disclosure contemplates any suitable storage.

In one or more embodiments, the server memory 130 includes a main memory for storing the instructions 132 for the one or more server processors 124 to execute or data for the one or more server processors 124 to operate on. As an example, and not by way of limitation, the user devices 112 may load the instructions 132 from another memory in the user devices 112. The one or more server processors 124 may then load the instructions 132 from the server memory 130 to an internal register or internal cache. To execute the instructions 132, the one or more server processors 124 may retrieve the instructions 132 from the internal register or internal cache and decode them. During or after execution of the instructions 132, the one or more server processors 124 may write one or more results (which may be intermediate or final results) to the internal register or internal cache. The one or more server processors 124 may then write one or more of those results to the server memory 130. In some embodiments, the one or more server processors 124 executes only the instructions 132 in one or more internal registers or internal caches or in the server memory 130 and operates only on data in one or more internal registers or internal caches or in the server memory 130.

In one or more embodiments, the server memory 130 includes commands or data associated with one or more specific applications in addition or as part of the instructions 132. In FIGS. 1A-1C, the server memory 130 includes the instructions 132, one or more user device profiles 150 configured to associate one or more entitlements 148 in a specific service 146 with one or more users 119 and/or one or more user devices 112 as provided by user device data 152, one or more rules and policies 154, access to the one or more network resources 110, one or more authentication reports 156 including authentication approvals 158 and authentication denials 160, the one or more requests 108, and one or more encryption/decryption operations 162.

The one or more user device profiles 150 may be configured to provide access to configuration parameters for the user devices 112 to operate (e.g., perform one or more tasks) in the device groups 116. The user device data 152 may be one or more collected information associated with a specific user 119 and/or a specific user device 112. The user device data 152 may be information, data elements, and/or data records representative of IDs associated with users 119 and/or user devices 112. The user device data 152 may be configuration information and/or operational parameters collected in accordance with one or more communication protocols. The user device data 152 may include information input by one or more of the users 119 via one or more of the user devices 112, one or more tracked operations associated with a given user 119 within a service 146. The entitlements 148 may be configured to provide one or more connectivity allowances to the user devices 112 in the device groups 116. For example, in accordance with one of the user device profiles 150 corresponding to the user device 112*b*, the user device 112*b* may be a desktop computer or communication terminal configured to communicate and route signaling among some of the additional user devices 112. In this regard, the entitlements 148 associated with a corresponding user device profile 150 of the user device 112*b* may indicate that the user device 112*b* is allowed to communicate with one or more components in the network 114 (e.g., core network components or servers including specific network functions (NF)) to communicate and route signaling.

The one or more encryption/decryption operations 162 may be one or more encryption operations and/or one or more decryption operations. The encryption operations may include safeguarding information using one or more of the server keys 134 and/or additional key elements, preventing access to information by scrambling, shifting, altering, adding, removing, and/or processes to protect information. The decryption operations may include safely retrieving information using one or more of the server keys 134 and/or additional key elements, obtaining controlled access to information by unscrambling, reorganizing, rearranging, adding, removing, and/or processes to access information.

The one or more requests 108 may be configured to request permissions and/or access for an entity. Herein, an entity may include at least one user device 112 and/or at least one user 119 using a user device 112. The requests 108 may be configured in accordance with one or more communication protocols. The requests 108 may be one or more alphanumeric bitstrings, messages, signals, and/or commands configured to trigger operations in the server 102.

The one or more authentication reports 156 may be one or more messages, commands, and/or control messages configured to provide one or more information elements, data elements, and/or data records. The authentication reports 156 may be configured to provide one or more approvals and/or denials of access to the one or more network resources 110. The one or more authentication approvals 158 may be one or more commands and/or information in at least one authentication report 156 in which access between one or more user devices 112 and one or more of the network resources 110 is approved. The one or more authentication denials 160 may be one or more commands and/or information in at least one authentication report 156 in which access between one or more user devices 112 and one or more of the network resources 110 is denied.

The one or more network resources 110 may be at least a portion of systems and/or devices associated with a network. In some embodiments, the network resources 110 may be cloud resources, power resources, memory resources, and processing resources that are consumed in attempts to access services 146 and/or applications in a given communication system 100. In other embodiments, the network resources 110 may be audio, visual, and/or sound data configured to be packaged as data streamed for playback. For example, the network resources 110 may include access to one or more applications in a network. In another example, the network resources 110 may include access to one or more databases and/or data storages associated with the server 102.

In some embodiments, the multiple rules and policies 154 may be information commanding rules and/or operations of the system 100. The rules and policies 154 may be updated dynamically or periodically over time. For example, the rules and policies 154 may provide guidelines to access, receive and transmit information using the server I/O interfaces 122. In other embodiments, the rules and policies 154 may be procedure or operational guidelines predefined by one or more organizations associated with the server 102. The rules and policies 154 may be one or more operation preferences that may include information associated with, or updated by, the user devices 112. The rules and policies 154 may be predefined data exchange parameters set in accordance with one or more operation preferences. For example, an organization may predefine in the rules and policies 154 of a given user device profile 150 that a given user device 112 is configured to exchange both video and sound during a communication exchange. Further, the rules and policies 154 may be dynamically modified data exchange parameters by a user 119 associated with a given user device 112. For example, a user 119 may set the rules and policies 154 to transmit specific data types during a communication exchange.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random access memory (RAM)-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 114 may be a combination of electronic devices forming a multi-node mesh. As an example, and not by way of limitation, one or more portions of the network 114 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 114, or a combination of two or more such networks.

In one or more embodiments, any one of the device groups 116 may include thousands of user devices 112 exchanging data with one another simultaneously, in accordance with their respective device groups 116, or in accordance with one or more sub-groups of user devices 112. In some embodiments, the user devices 112 represent devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), ear devices, and the like), and so forth. The user devices 112 may also include Internet of Things (IoT) devices or equipment, such as agricultural equipment (e.g., livestock tracking and management systems, watering devices, unmanned aerial vehicles (UAVs), and the like); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, and the like); healthcare devices (e.g., pacemakers, biometric sensors, medical equipment, and the like); industrial equipment (e.g., robots, factory machinery, construction equipment, industrial sensors, and the like); retail equipment (e.g., vending machines, point of sale (POS) devices, Radio Frequency Identification (RFID) tags, and the like); smart city devices (e.g., street lamps, parking meters, waste management sensors, and the like); transportation and logistical equipment (e.g., turnstiles, rental car trackers, navigational devices, inventory monitors, and the like); and so forth.

Referring to the user device 112*a* as a non-limiting example, the user devices 112 may include one or more device I/O interfaces 164 configured to perform one or more data exchange operations and/or one or more entered credentials 166 may be received from an input, a device processor 168 including a device processing engine 170, a device memory 172 including one or more device instructions 176, one or more encrypted messages 178, one or more single sign on (SSO) operations 180, and one or more multi-factor authentication operations 182, and at least one secure hardware 174 including at least one service data repository including one or more local service identifiers 186, one or more manufacturer identifiers 188, and one or more device keys 190. In one or more embodiments, the one or more user devices 112 include end-user devices such as laptops, phones, tablets, and any other suitable device that are capable of receiving, creating, processing, storing, or communicating information, including data packet transmissions.

The device I/O interfaces 164 may be configured to perform one or more of the operations described in reference to the server I/O interfaces 122. For example, the device I/O interfaces 164 may be configured to perform one or more data exchange operations described in reference to the server I/O interfaces 122. The entered credentials 166 may be one or more numbers, letters, one or more alphanumeric, one or more bitstrings, and/or one or more pins configured to provide passcode and/or password protection and/or access to data. The entered credentials 166 may be a username-password combination pair, an image representative of access using a scanned code, one or more images and/or sounds aimed to denote veracity of an identity of a user 119. The entered credentials 166 may be one or more of the user credentials 136 just entered by one of the users 119 and prior to being transmitted to the server 102.

The device processor 168 may be configured to perform one or more of the operations described in reference to the one or more server processors 124, the device processing engine 170 may be configured to perform one or more of the operations described in reference to the server processing engine 126, the device memory 172 may be configured to perform one or more of the operations described in reference to the server memory 130, and the secure hardware 174 may be configured to perform one or more of the operations described in reference to the one or more secure databases 128.

In some embodiments, the device instructions 176 may be used to perform one or more of the operations described in reference to the instructions 132. The encrypted messages 178 may be one or more messages and/or control commands configured to provide information to the server 102 and/or one or more additional user devices 112. The single sign on operations 180 may be one or more operations in which single sign on (SSO) operations are performed. The single sign on operations 180 may include log in to multiple services 146 with one set of entered credentials 166. The single sign on operations 180 may be used to access services 146 on-premises or in the cloud. The single sign on operations 180 is a protocol used to authenticate and/or authorize users to multiple services 146 (e.g., applications) using a single set of credentials. The multi-factor authentication operations 182 may be one or more operations in which multi factor authentication (MFA) operations are performed. The multi-factor authentication operations 182 may include more than one of the entered credentials 166 to log in to a system. The entered credentials 166 may include a password, a code sent to a user device 112, a fingerprint scan, or answering a secret question.

In some embodiments, the device I/O interfaces 164 may include access to the at least one secure hardware 174 communicatively coupled to the one or more device processors 168 and the device memory 172. The one or more secure hardware 174 may include the one or more wired connections that share an internal bandwidth for data packet transmissions inside the server 102 with the server memory 130. The at least one secure hardware 174 may be configured with a buffering capacity and a memory speed. The buffering capacity may indicate a buffering capacity (in bytes) that the storage and databases are capable of handling.

In some embodiments, while the at least one secure hardware 174 and the device memory 172 are shown as separate portions of the user device 112*a*, the at least one secure hardware 174 and the device memory 172 may be included in a same memory unit and/or one or more additional memory units. Further, the device memory 172 may be protected and/or encrypted as described in reference to the secure databases 128. In one or more embodiments, the secure hardware 174 may be configured to store one or more data elements and/or record elements. The secure hardware 174 may be configured to store encrypted data, secured data elements, and/or tokens representative of actual data.

The service data repository 184 may be one or more databases in which the user device 112*a* is configured to store one or more specific data elements and/or data records. In some embodiments, the service data repository 184 is configured to store one or more local service identifiers 186. The one or more local service identifiers 186 may be one or more of the service IDs 144 associated with one or more specific services 146 locally operating in the user device 112*a*. The one or more manufacturer identifications 188 may be one or more of the user device IDs 142 associated with the manufacturing, sale, and/or maintenance of the user device 112*a*. the manufacturer identifications 188 may include make and/or model associated with the user device 112*a*. The one or more device keys 190 may be one or more passphrases, encryption keys, passwords, passkeys, access commands, decryption parameters, and/or pin codes configured to enable decryption, encryption, and/or combination of one or more data elements and/or one or more data records.

FIGS. 2A and 2B shows an operational flow 200 to leverage hardware-based device identity for cookieless session tracking, in accordance with one or more embodiments. In FIGS. 2A and 2B, the operational flow 200 may be performed by different components in the server 102 and/or the one or more user devices 112. In particular, the operational flow 200 may be performed using the one or more server processors 124 of the server 102 and/or one or more device processors 168 of the one or more user devices 112. As a non-limiting example, the server 102 may be configured to verify information associated with at least one user 119 and/or one or more user devices 112. The server 102 may be configured to perform one or more operations to verify user device data 152, one or more user devices 112, and/or one or more users 119. Herein, the server 102 may be configured to perform one or more of operations 220-256. In some embodiments, while operations 220-256 are shown in a specific order, alternative arrangements may be performed such as one or more operations being performed in different sequences, in parallel, and/or omitting one or more of the operations 220-256. The operations 220-256 may cause one or more data exchanges performed between the user 119*a*, at least one network interface 270, the device processor 168, and the secure hardware 174 in the user device 112*a* and at least one authentication system 280 in the server 102.

The operational flow 200 may start with the user device 112*a* obtaining at least one log in credential and/or one or more from one or more secure hardware 174 and/or one or more users 119 (e.g., as exemplified by the user 119*a* in FIGS. 2A and 2B). In the user device 112*a*, a network interface 270 may be a digital network interface including a user interface of a browser in one or more of the device I/O interfaces 164. At operation 210, the user device 112*a* may be configured to receive one or more requests 108 to access one or more network resources 110 associated with one or more services 146. In this regard, the network resources 110 may be one or more memory resources, such as databases in which the services 146 stores one or more data elements and/or data records. At operation 212, the network interface 270 may be configured to pre-authenticate any received user data 152 with the authentication system 280 in the server 102. At operation 214, the authentication system 280 may be configured to evaluate the user data 152 against information stored in the secure databases 128.

At operation 216, the network interface 270 may be configured to trigger a posture report from the device processor 168. At operation 218, the device processor 168 may be configured to sign a report with one or more device keys 190 in the user device 112*a*. At operation 220, the secure hardware 174 in the user device 112*a* may be configured to determine one or more identifiers to be shared with the server 102 as one or more session identifiers 138. At operation 222, the secure hardware 174 may be configured to generate one or more signatures providing information associated with one or more open sessions.

At operation 224, the device processor 168 may be configured to transmit one or more signed posture reports including one or more user IDs 140, one or more user device IDs 142, and/or one or more service IDs 144. At operation 226, the authentication system 280 is configured to store the identifiers provided by the user device 112*a*. At operation 228, the authentication system 280 is configured to provide at acknowledge response to the device processor 168. At operation 230, the device processor 168 is configured to provide at acknowledge response to the network interface 270.

At operation 232, the authentication system 280 is configured to look for a saved session in the secure database 128, which includes information associated with the user 119*a*, the user device 112*a*, and/or a specific service 146. At operation 234, the authentication system 280 may be configured to determine whether the user 119*a* and/or the user device 112*a* is authenticated. Herein, the authentication system 280 may be configured to generate one or more authentication reports 156 including at least one authentication approval 158 or an authentication denial 160. At operation 236, the authentication system 280 may be configured to provide the authentication report 156 to the network interface 270 in the user device 112*a*.

At operation 238, the user device 112*a* may be configured to provide one or more prompts to the user 119*a* to confirm one or more corresponding user credentials 136. At operation 240, the user device 112*a* may be configured to prompt the user 119*a* for the one or more user credentials 136. At operation 242, the user device 112*a* may be configurable to allow one or more interfaces to receive the user credentials 136. At operation 244, the user device 112*a* may be configured to receive one or more of the user credentials 136 from the user 119*a*.

At operation 246, the network interface 270 may be configured to request authentication of the user credentials 136 to the authentication system 280. At operation 248, the authentication system 280 may be configured to determine user information, one or more local service identifiers 186, and/or one or more manufacturer identifiers 188. At this stage, the authentication system 280 may be configured to store the user information, one or more local service identifiers 186, and/or one or more manufacturer identifiers 188 as one or more of the session identifiers 138. At operation 252, the authentication system 280 may be configured to provide one or more acknowledgements to the network interface referencing that the identity of the user 119*a* and/or the user device 112*a* is verified and/or authenticated. Herein, no browser cookies are used to confirm the information associated with the user 119*a* and/or the user device 112*a*. At operation 256, the user device 112*a* may be configured to prompt to the user 119*a* that authentication is successful.

As a non-limiting example, the operational flow 200 may include one or more operations configured to leverage hardware-based device identity for cookieless session tracking. In FIGS. 2A and 2B, the operational flow 200 illustrates includes the user 119*a*, the user device 112, and the server 102. The user device 112 may include the network interface 270 with a browser, the device processor 168 with a service 146 (e.g., a security application such as Duo Desktop), and the secure hardware 174 (e.g., a hardware security module in the user device 112*a*). The server 102 may be configured as a cloud service that includes the authentication system 280 (e.g., an authentication service). In this example, the details of the operational flow 200 are as follows. At operation 210, user 119*a* may log into user device 112*a*. For example, user 119*a* may begin an authentication process for an application in a browser (via the digital network interface in the network interface 270) or an embedded web view on the user device 112*a*. At operation 212, the browser in user device 112*a* may be configured to pre-authenticate user 119*a* using authentication service of the cloud service.

At operation 216, the browser may trigger a posture report. For example, during the authentication process, Duo Desktop, as one of the services 146 running in the device processor 168, may prompt running within the browser or an embedded web view on user device 112*a* may initiate an HTTPS request to a localhost listener of the security application (e.g., Duo Desktop application) running on that same user device 112*a*, requesting a posture report on user device 112*a*.

At operation 218, the security application of user device 112*a* may sign the posture report with one or more private keys (e.g., one or more of the device keys 190) associated with user device 112*a* and send the signed report to the hardware security module of user device 112*a*. For example, a security application (e.g., Duo Desktop) may collect posture data including various device identifiers and then sign the posture report using the signing keys that uniquely identify user 119*a* and user device 112*a*. In certain embodiments, these keys may be stored within the hardware security module (e.g., a hardware encryption module such as a TPM or SecureEnclave).

At operation 222, the hardware security module may communicate one or more signatures to the security application. At operation 224, the security application may communicate the signed posture report along with identifiers for user 119*a*, user device 112*a*, and one or more applications (e.g., the services 146) to the authentication service (e.g., the authentication system 280). For example, the posture report may be sent up to Duo's cloud services, where the signatures are validated against public keys that are stored in the Duo cloud associated with user 119*a* and user device 112*a*.

At operation 228, the authentication service may communicate a message acknowledging receipt of the signed posture report to the security application. At operation 230, the security application may communicate a message acknowledging receipt of the signed posture report to the browser.

At operation 232, the authentication service may search for a saved session for user 119*a*, user device 112*a*, and an application. For example, once user 119*a*'s identity and user device 112*a* may have been cryptographically validated, the authentication service may look up any sessions associated with that user 119*a*, user device 112*a*, and the application that user 119*a* is authenticating into. If, at operation 232, a saved session is found, the operational flow 200 may move to operation 234, and authentication may be completed. For example, if any existing session is found for user 119*a*, user device 112*a*, and the application, then that existing session is used, and user 119*a* can be authenticated without interaction.

If, at operation 232, a saved session is not found, the operational flow 200 advances to operation 236, where the authentication service sends a message to the browser to proceed with interactive authentication. For example, if no session is found for user 119*a*, user device 112*a*, and the application, then user 119*a* authenticates as normal, and authentication service may create a new session once the authentication is successful.

At operation 240, the browser communicates a prompt to user 119*a*, requesting user 119*a*'s credentials. At operation 244, user 119*a* provides their credentials (e.g., password and/or MFA) to the browser. At operation 246, the browser communicates a request for authentication to the authentication service. At operation 248, if the authentication is successful, the authentication service may save the session for user 119*a*, user device 112*a*, and the application. At operation 252, the authentication service communicates a message acknowledging the authentication. No cookies are required to communicate this message. At operation 256, the browser may communicate a message to user 119*a* letting user 119*a* know that the authentication is complete.

FIGS. 3A and 3B show a flowchart of process 300 to leverage hardware-based device identity for cookieless session tracking, in accordance with one or more embodiments. Modifications, additions, or omissions may be made to the process 300 of FIGS. 3A and 3B. The process 300 of FIGS. 3A and 3B may include more, fewer, or other operations than those shown below. For example, operations may be performed in parallel or in any suitable order. While at times discussed as the server 102, the one or more user devices 112, or components of any of thereof, any suitable system or components of the system 100 may perform one or more operations of the process 300 of FIGS. 3A and 3B. For example, one or more operations 302-362 of process 300 may be implemented, at least in part, in the form of instructions 132 of FIGS. 1A-1C, stored on non-transitory, tangible, machine-readable media (e.g., server memory 130 of FIGS. 1A-1C) that when run by one or more processors (e.g., one or more server processors 124 of FIGS. 1A-1C) may cause the one or more processors to perform operations described in operations 302-362. While the process 300 in FIGS. 3A and 3B illustrates operations 302-310 and 350-362 as being performed by the user device 112*a* and operations 320-344 as being performed by the authentication system 280, less or more operations may be performed in any of the device elements and/or components shown in the system 100 of FIGS. 1A-1C.

The process 300 starts at operation 302, where the user device 112*a* is configured to request access to network resources 110 associated with a service 146 via a digital network interface (e.g., the network interface 270). At operation 304, the user device 112*a* may be configured to receive a posture evaluation request from the digital network interface. At operation 306, the user device 112*a* may be configured to retrieve one or more identifiers from a secure hardware 174 collocated in the user device 112*a*. At operation 308, the user device 112*a* may be configured to sign, using one or more private keys, the one or more identifiers into an encrypted message. The user device 112*a* may be configured to sign, using one or more private keys, an entire payload including the one or more identifiers. At operation 310, the user device 112*a* may be configured to transmit the encrypted message 178 to an authentication system 280.

The process 300 may transition from the user device 112*a* to the authentication system 280 of the server 102. At operation 320, the authentication system 280 may be configured to extract the one or more identifiers from the encrypted message 178. The authentication system 280 may be configured to extract the one or more identifiers from a payload and retrieve associated public keys, then validate all signatures in the payload. If the user device 112*a* did not have the correct private key for the one or more identifier, the signature may be considered invalid. If the user device 112*a* had the correct private key for the one or more identifier, the signature may be considered valid. At operation 322, the authentication system 280 may be configured to determine whether the one or more identifiers at least partially match at least one session identifier 138 associated with a saved session in a secure database 128. In some embodiments, the authentication system 280 may be configured to determine whether all identifiers fully match at least one saved session.

The process 300 may transition from the authentication system 280 of the server 102 to the user device 112*a*. The process 300 continues at operation 350, where the user device 112*a* determines whether the authentication report 156 includes an authentication approval 158 or an authentication denial 160. If the authentication report 156 includes an authentication denial 160 (e.g., DENIAL), the process 300 continues to operation 352. At operation 332, the user device 112*a* may be configured to block access between network resources 110 and the user device 112*a* via the digital network interface. If the authentication report 156 includes an authentication approval 158 (e.g., APPROVAL), the process 300 proceeds to operation 362. At operation 362, the user device 112*a* may be configured to access network resources 110 via the digital network interface. The process 300 may end at operation 352 or 362.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may include non-transitory computer-readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may include a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. A network component, comprising:

one or more processors; and one or more computer-readable non-transitory storage media coupled to the one or more processors and comprising instructions that, when executed by the one or more processors, cause the network component to perform operations comprising:

receiving a first encrypted message from a first digital network interface, wherein:

the first encrypted message includes one or more identifiers signed using one or more private keys;

the first encrypted message is encrypted as part of one or more operations configured to request access to a first plurality of network resources via the first digital network interface; and the one or more identifiers reference a service identifier that is associated with a service;

extracting the one or more identifiers from the first encrypted message;

validating a signature associated with the one or more identifiers, determining whether the one or more identifiers at least partially match at least one session identifier associated with a saved session in a secure database;

in response to determining that the one or more identifiers at least partially match the at least one session identifier associated with the saved session in the secure database, transmitting an authentication approval to the first digital network interface; and in response to transmitting the authentication approval to the first digital network interface, enabling access to the first plurality of network resources via the first digital network interface.

2. The network component of claim 1, the operations further comprising:

receiving a second encrypted message from a second digital network interface, wherein:

the second encrypted message includes the one or more identifiers signed using the one or more private keys; and the second encrypted message is encrypted as part of one or more operations configured to request access to a second plurality of network resources via the second digital network interface;

extracting the one or more identifiers from the second encrypted message;

validating a signature associated with the one or more identifiers, determining whether the one or more identifiers at least partially match the at least one session identifier associated with the saved session in the secure database;

in response to determining that the one or more identifiers do not at least partially match the at least one session identifier associated with the saved session in the secure database, transmitting an authentication denial to the second digital network interface; and in response to transmitting the authentication denial to the second digital network interface, blocking access to the second plurality of network resources via the second digital network interface.

3. The network component of claim 1, the operations further comprising:

receiving a second encrypted message from a second digital network interface, wherein:

the second encrypted message includes a plurality of credentials;

the second encrypted message includes the one or more identifiers signed using the one or more private keys; and the second encrypted message is encrypted as part of one or more operations configured to request access to a second plurality of network resources via the second digital network interface;

extracting the plurality of credentials and the one or more identifiers from the second encrypted message;

validating a signature associated with the one or more identifiers, verifying the plurality of credentials against one or more stored credentials in the secure database;

starting a new session in the secure database;

generating a new session identifier based at least in part upon the one or more identifiers in the secure database;

transmitting an additional authentication approval to the second digital network interface; and in response to transmitting the authentication approval to the second digital network interface, enabling access to the second plurality of network resources via the second digital network interface.

4. The network component of claim 3, wherein the plurality of credentials:

is retrieved via an input interface from the secure database collocated and communicatively coupled with the one or more processors; and is entered in the input interface by a user.

5. The network component of claim 3, wherein:

the plurality of credentials includes a password certified via a multi-factor authentication process.

6. The network component of claim 3, the operations further comprising:

receiving a third encrypted message from a third digital network interface, wherein:

the third encrypted message includes the one or more identifiers signed using the one or more private keys; and the third encrypted message is encrypted as part of one or more operations configured to request access to a third plurality of network resources via the third digital network interface;

extracting the one or more identifiers from the third encrypted message;

validating a signature associated with the one or more identifiers, determining whether the one or more identifiers at least partially match the new session identifier associated with the new session in the secure database;

in response to determining that the one or more identifiers at least partially match the new session identifier associated with the new session in the secure database, transmitting a new additional authentication approval to the third digital network interface; and in response to transmitting the new additional authentication approval to the third digital network interface, enabling access to the third plurality of network resources via the third digital network interface.

7. The network component of claim 1, wherein:

the first digital network interface does not store or exchange browser cookies.

8. A method, comprising:

receiving a first encrypted message from a first digital network interface, wherein:

the first encrypted message includes one or more identifiers signed using one or more private keys;

the first encrypted message is encrypted as part of one or more operations configured to request access to a first plurality of network resources via the first digital network interface; and the one or more identifiers reference a service identifier that is associated with a service;

extracting the one or more identifiers from the first encrypted message;

validating a signature associated with the one or more identifiers, determining whether the one or more identifiers at least partially match at least one session identifier associated with a saved session in a secure database;

in response to determining that the one or more identifiers at least partially match the at least one session identifier associated with the saved session in the secure database, transmitting an authentication approval to the first digital network interface; and in response to transmitting the authentication approval to the first digital network interface, enabling access to the first plurality of network resources via the first digital network interface.

9. The method of claim 8, further comprising:

receiving a second encrypted message from a second digital network interface, wherein:

the second encrypted message includes the one or more identifiers signed using the one or more private keys; and the second encrypted message is encrypted as part of one or more operations configured to request access to a second plurality of network resources via the second digital network interface;

extracting the one or more identifiers from the second encrypted message;

validating a signature associated with the one or more identifiers;

determining whether the one or more identifiers at least partially match the at least one session identifier associated with the saved session in the secure database;

in response to determining that the one or more identifiers do not at least partially match the at least one session identifier associated with the saved session in the secure database, transmitting an authentication denial to the second digital network interface; and in response to transmitting the authentication denial to the second digital network interface, blocking access to the second plurality of network resources via the second digital network interface.

10. The method of claim 8, further comprising:

receiving a second encrypted message from a second digital network interface, wherein:

the second encrypted message includes a plurality of credentials;

the second encrypted message includes the one or more identifiers signed using the one or more private keys; and the second encrypted message is encrypted as part of one or more operations configured to request access to a second plurality of network resources via the second digital network interface;

extracting the plurality of credentials and the one or more identifiers from the second encrypted message;

validating a signature associated with the one or more identifiers;

verifying the plurality of credentials against one or more stored credentials in the secure database;

starting a new session in the secure database;

generating a new session identifier based at least in part upon the one or more identifiers in the secure database;

transmitting an additional authentication approval to the second digital network interface; and in response to transmitting the authentication approval to the second digital network interface, enabling access to the second plurality of network resources via the second digital network interface.

11. The method of claim 10, wherein the plurality of credentials:

is retrieved via an input interface from the secure database; and is entered in the input interface by a user.

12. The method of claim 10, wherein:

the plurality of credentials includes a password certified via a multi-factor authentication process.

13. The method of claim 10, further comprising:

receiving a third encrypted message from a third digital network interface, wherein:

the third encrypted message includes the one or more identifiers signed using the one or more private keys; and the third encrypted message is encrypted as part of one or more operations configured to request access to a third plurality of network resources via the third digital network interface;

extracting the one or more identifiers from the third encrypted message;

validating a signature associated with the one or more identifiers;

determining whether the one or more identifiers at least partially match the new session identifier associated with the new session in the secure database;

in response to determining that the one or more identifiers at least partially match the new session identifier associated with the new session in the secure database, transmitting a new additional authentication approval to the third digital network interface; and in response to transmitting the new additional authentication approval to the third digital network interface, enabling access to the third plurality of network resources via the third digital network interface.

14. The method of claim 10, wherein:

the first digital network interface does not store or exchange browser cookies.

15. A non-transitory computer-readable medium storing instructions that, when executed by a processor, cause the processor to perform operations comprising:

receiving a first encrypted message from a first digital network interface, wherein:

the first encrypted message includes one or more identifiers signed using one or more private keys;

the first encrypted message is encrypted as part of one or more operations configured to request access to a first plurality of network resources via the first digital network interface; and the one or more identifiers reference a service identifier that is associated with a service;

extracting the one or more identifiers from the first encrypted message;

validating a signature associated with the one or more identifiers;

determining whether the one or more identifiers at least partially match at least one session identifier associated with a saved session in a secure database;

in response to determining that the one or more identifiers at least partially match the at least one session identifier associated with the saved session in the secure database, transmitting an authentication approval to the first digital network interface; and in response to transmitting the authentication approval to the first digital network interface, enabling access to the first plurality of network resources via the first digital network interface.

16. The non-transitory computer-readable medium of claim 15, the operations further comprising:

receiving a second encrypted message from a second digital network interface, wherein:

the second encrypted message includes the one or more identifiers signed using the one or more private keys; and the second encrypted message is encrypted as part of one or more operations configured to request access to a second plurality of network resources via the second digital network interface;

extracting the one or more identifiers from the second encrypted message;

validating a signature associated with the one or more identifiers;

determining whether the one or more identifiers at least partially match the at least one session identifier associated with the saved session in the secure database;

in response to determining that the one or more identifiers do not at least partially match the at least one session identifier associated with the saved session in the secure database, transmitting an authentication denial to the second digital network interface; and in response to transmitting the authentication denial to the second digital network interface, blocking access to the second plurality of network resources via the second digital network interface.

17. The non-transitory computer-readable medium of claim 15, the operations further comprising:

receiving a second encrypted message from a second digital network interface, wherein:

the second encrypted message includes a plurality of credentials;

the second encrypted message includes the one or more identifiers signed using the one or more private keys; and the second encrypted message is encrypted as part of one or more operations configured to request access to a second plurality of network resources via the second digital network interface;

extracting the plurality of credentials and the one or more identifiers from the second encrypted message;

validating a signature associated with the one or more identifiers;

verifying the plurality of credentials against one or more stored credentials in the secure database;

starting a new session in the secure database;

generating a new session identifier based at least in part upon the one or more identifiers in the secure database;

transmitting an additional authentication approval to the second digital network interface; and in response to transmitting the authentication approval to the second digital network interface, enabling access to the second plurality of network resources via the second digital network interface.

18. The non-transitory computer-readable medium of claim 17, wherein the plurality of credentials:

is retrieved via an input interface from the secure database collocated and communicatively coupled with the processor; and is entered in the input interface by a user.

19. The non-transitory computer-readable medium of claim 17, wherein:

the plurality of credentials includes a password certified via a multi-factor authentication process.

20. The non-transitory computer-readable medium of claim 17, the operations further comprising:

receiving a third encrypted message from a third digital network interface, wherein:

the third encrypted message includes the one or more identifiers signed using the one or more private keys; and the third encrypted message is encrypted as part of one or more operations configured to request access to a third plurality of network resources via the third digital network interface;

extracting the one or more identifiers from the third encrypted message;

validating a signature associated with the one or more identifiers;

determining whether the one or more identifiers at least partially match the new session identifier associated with the new session in the secure database;

in response to determining that the one or more identifiers at least partially match the new session identifier associated with the new session in the secure database, transmitting a new additional authentication approval to the third digital network interface; and in response to transmitting the new additional authentication approval to the third digital network interface, enabling access to the third plurality of network resources via the third digital network interface.

* * * * *